US012693855B2

(12) United States Patent
Jahr

(10) Patent No.: US 12,693,855 B2
(45) Date of Patent: Jul. 28, 2026

(54) CODE AUTHENTICATION IN A GIT REPOSITORY

(71) Applicant: SAP SE, Walldorf (DE)

(72) Inventor: Andreas Jahr, Karlrsruhe (DE)

(73) Assignee: SAP SE, Walldorf (DE)

( * ) Notice: Subject to any disclaimer, the term of this patent is extended or adjusted under 35 U.S.C. 154(b) by 287 days.

(21) Appl. No.: 18/528,500

(22) Filed: Dec. 4, 2023

(65) Prior Publication Data

US 2025/0181346 A1    Jun. 5, 2025

(51) Int. Cl.
G06F 8/71        (2018.01)
G06F 21/44       (2013.01)

(52) U.S. Cl.
CPC ............... G06F 8/71 (2013.01); G06F 21/44 (2013.01)

(58) Field of Classification Search
USPC ........................................................ 717/120
See application file for complete search history.

(56) References Cited

U.S. PATENT DOCUMENTS

| 7,266,734 B2 * | 9/2007 | Chavez, Jr. ............... | G06F 1/28 |
| | | | 714/48 |
| 10,325,079 B1 * | 6/2019 | Vukich ................. | G06F 21/121 |
| 11,232,097 B1 * | 1/2022 | Antao ........................ | G06F 8/41 |
| 11,544,050 B1 * | 1/2023 | Ankit .................... | G06F 21/629 |
| 2005/0108295 A1 * | 5/2005 | Karimisetty ........ | G06F 16/8373 |
| 2018/0205549 A1 | 7/2018 | Blinn | |

| 2019/0205121 A1 * | 7/2019 | Ericson ................. | H04L 9/3247 |
| 2021/0182391 A1 | 6/2021 | Plate | |
| 2021/0263719 A1 * | 8/2021 | Pai .......................... | H04L 9/0637 |
| 2022/0253310 A1 * | 8/2022 | Bastide ..................... | G06F 8/77 |
| 2022/0374439 A1 * | 11/2022 | Hu ...................... | G06F 16/2365 |
| 2023/0305813 A1 * | 9/2023 | Jalal ........................... | G06F 8/10 |
| 2024/0036860 A1 * | 2/2024 | Li ............................. | G06F 8/65 |
| 2024/0054230 A1 * | 2/2024 | Bouchard ............. | G06F 21/577 |
| 2024/0134783 A1 * | 4/2024 | Yagami .............. | G06F 11/3688 |
| 2024/0323032 A1 * | 9/2024 | Manning ............... | H04L 9/0891 |

(Continued)

OTHER PUBLICATIONS

Chacon, "Pro Git", 2014, Apress (Year: 2014).*

(Continued)

*Primary Examiner* — Hossain M Morshed
(74) *Attorney, Agent, or Firm* — Fountainhead Law Group, PC

(57)        ABSTRACT

Embodiments implement a central commit registry to ensure integrity of code within a Git repository, and the authentication of that code with the requirements of a particular computing system. The git repository stores snapshots of the software code as git commits while a version repository stores git commit files that contain information to uniquely identify git commits that originated from the source system. The git commit files are created with a version repository user that is only shared between a version repository, a source system and a target system. Before the target system deploys git commits received from the git repository, the target system authenticates the git commit by remotely logging into the version repository as a version repository user, querying the version repository for a git commit file that corresponds to the git commit, and verifying that the contents of the git commit file uniquely identifies the git commit.

19 Claims, 6 Drawing Sheets

(56) References Cited

U.S. PATENT DOCUMENTS

| | | | |
|---|---|---|---|
| 2025/0123824 A1 * | 4/2025 | Mahanta | .................. G06F 8/433 |
| 2025/0165890 A1 * | 5/2025 | Medford | ................... G06F 8/10 |

OTHER PUBLICATIONS

Chacon, S., & Straub, B. (2014). Git Basics. In Pro Git (pp. 15-41). Berkeley, CA: Apress. (Year: 2014).

Devopscube, "How to CheckouUClone From a Specific Git Commit Id (SHA)" (2021), , https://devopscube. com/checkout-clone-specific-git-com mit-id-sha/ (Year: 2021).

McKenzie, C., "Git vs. GitHub: What is the difference between them?" (2018), https://www.theserverside.com/video/Git-vs-GitHub-What-is-the-difference-between-them#:-:text=The%20key% 20difference%20between%20Git,is%20an%20online% 20SaaS% 20service. (Year: 2018).

Liang, Z., Sun, W., Venkatakrishnan, V. N., & Sekar, R. (2009). Alcatraz: An isolated environment for experimenting with untrusted software. ACM Transactions on Information and System Security (TISSEC), 12(3), 1-37. (Year: 2009).

Afzali, H., Torres-Arias, S., Curtmola, R., & Cappas, J. (May 2018). le-git-imate: Towards verifiable web-based Git repositories. In Proceedings of the 2018 on Asia Conference on Computer and Communications Security (pp. 469-482). (Year: 2018).

Torres-Arias, S., Ammula, A K., Curtmola, R., & Cappas, J. (2016). On omitting commits and committing omissions: Preventing git metadata tampering that (re) introduces software vulnerabilities. In 25th USENIX Security Symposium (USENIX Security 16) (pp. 379-395). (Year: 2016).

Vaidya, S. (2022). Towards Ensuring Integrity and Authenticity of Software Repositories (Doctoral dissertation, New Jersey Institute of Technology). (Year: 2022).

* cited by examiner

300

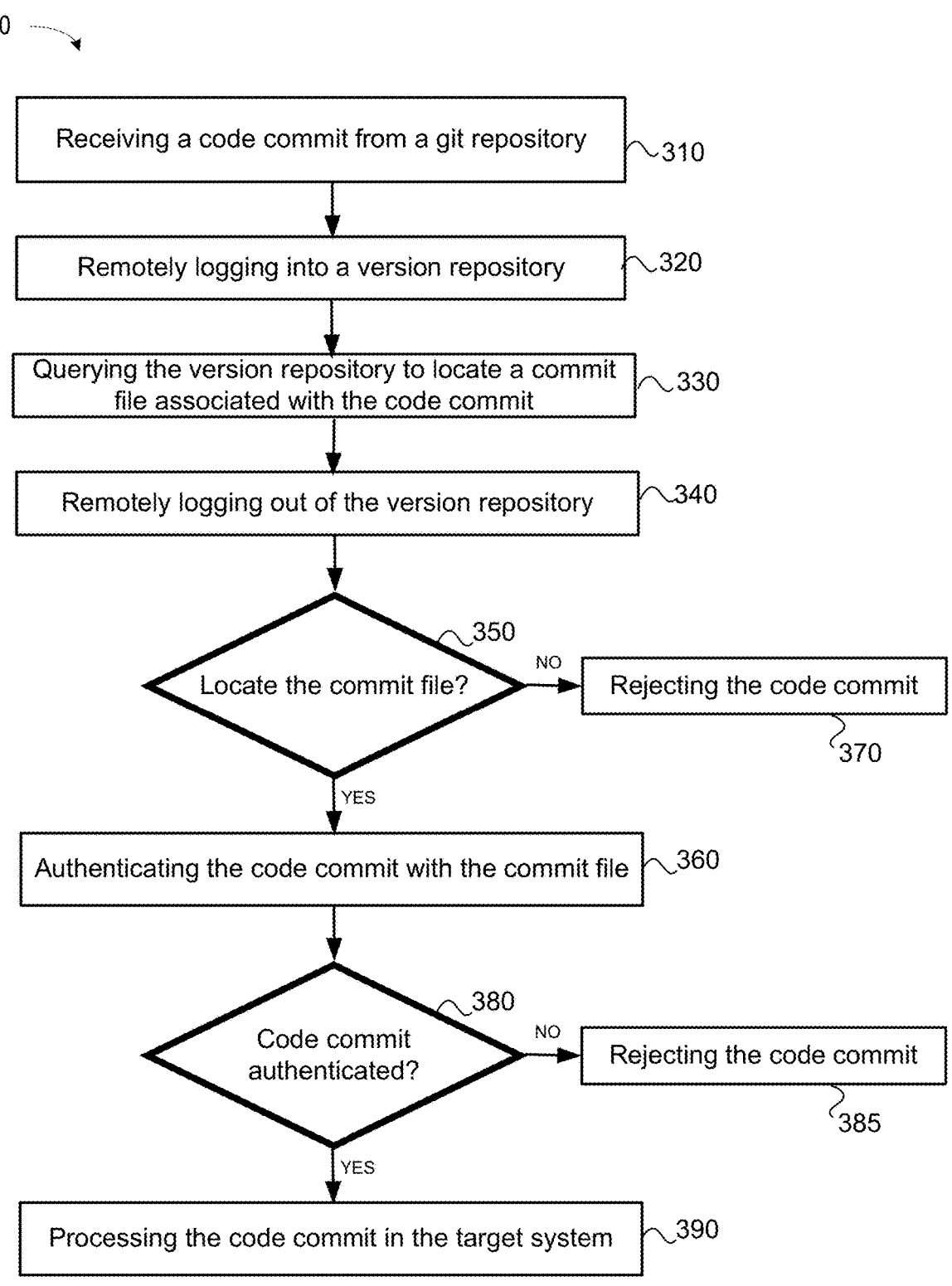

Receiving a code commit from a git repository ~310

Remotely logging into a version repository ~320

Querying the version repository to locate a commit file associated with the code commit ~330

Remotely logging out of the version repository ~340

Locate the commit file? ~350

NO → Rejecting the code commit ~370

YES

Authenticating the code commit with the commit file ~360

Code commit authenticated? ~380

NO → Rejecting the code commit ~385

YES

Processing the code commit in the target system ~390

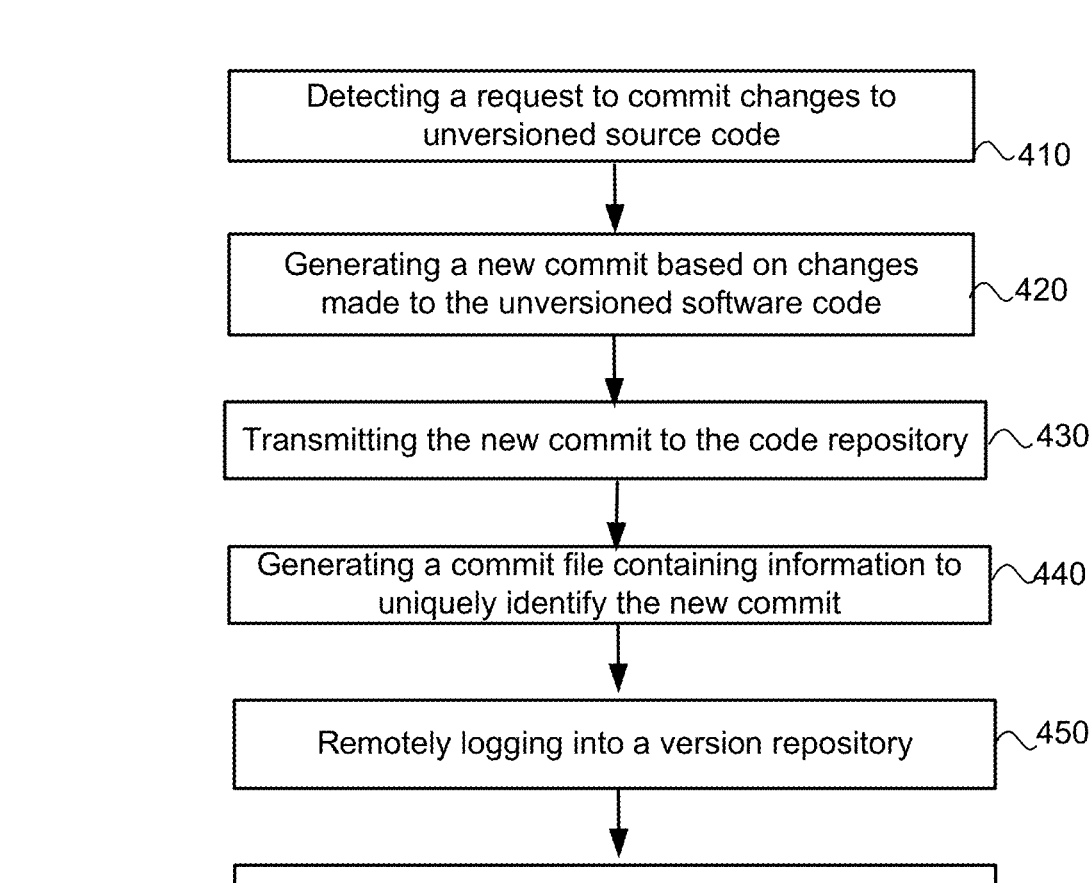

Detecting a request to commit changes to unversioned source code ～410

Generating a new commit based on changes made to the unversioned software code ～420

Transmitting the new commit to the code repository ～430

Generating a commit file containing information to uniquely identify the new commit ～440

Remotely logging into a version repository ～450

Storing the commit file in the version repository ～460

Remotely logging out of the version repository ～470

FIG. 4

CODE AUTHENTICATION IN A GIT REPOSITORY

BACKGROUND

Unless otherwise indicated herein, the approaches described in this section are not prior art to the claims in this application and are not admitted to be prior art by inclusion in this section.

In software development, code is often written in a development system and versioned in an external git repository. The external git repository stores commits which can be thought of as snapshots of the software code. A production system in which the software is deployed accesses the external git repository to receive updates to the software code. While there are many advantages to the git repository, one concern is that a bad actor could alter the software code outside of the development system and store the altered code in the external git repository. This corrupted commit would eventually spoil the production system when being imported. Thus, there is a need for a solution to authenticate commits in a git repository.

SUMMARY

Embodiments implement a central commit registry to ensure integrity of code within a code git repository, and the authentication of that code with the requirements of a particular computing system. A software developer may make changes to an unversioned copy of the software in a source system (which could also be known as a development system). When the developer is satisfied with the changes, the developer may commit the changes out of the source system and register the changes as a commit in the code git repository. The code git repository is stores versioned code where different versions of the code are stored as a commit. The commits have a sequential order such that each commit can represent a snapshot of the software. As a security measure, a git version repository may store git commit files corresponding to git commits that originated from the source system. For example, when a git commit that originated from the source system is transmitted to the code git repository, the source system may also generate a git commit file that is associated with the git commit and store the git commit file in the git version repository. The git commit file can store data that uniquely identifies the corresponding git commit. For example, a unique ID that is unique to a particular git commit can be stored. As another example, a hash of the git commit can be stored. In one embodiment, generation of the git commit file and the transmission of the git commit to the code git repository can occur simultaneously.

A target system (which could also be known as a production system) that deploys the software can subsequently receive the software update represented as a git commit. Before merging the git commit to the source code stored in the target system, the target system may authenticate the git commit as being valid. In one embodiment, the target system can authenticate the software by remotely logging into the git version repository, download the git commit file that corresponds to the git commit, and compare the information within the git commit file with the git commit. In one example, the target system may compare the unique ID stored within the git commit file and the unique ID of the git commit to determine whether they are the same. If they are the same, then the git commit is considered authentic and originated from the source system and thus can be merged into the software code. If however the unique IDs are different or the git version repository does not store a git commit file corresponding to the git commit, then the git commit is not considered authentic and therefore not originating from the source system. As such, the git commit can be discarded by the target system. The target system may reject the import of code from the git repository. In this manner, embodiments facilitate the use of a pair of git repositories (code git repository and version git repository) for delivering code to platforms, thereby allowing the safe/compliant import of code updates.

The access to the version git repository can be restricted to only one single set of user credentials. These credentials are shared to only the source and the target system. Any developer or other users having access to the code repository are excluded from the version repository. In other words, the access to the version repository is only possible for the source and the target system (source system upon creation of the commit file, target system upon reading the file). The restrictedly shared credentials ensure that commit files can only be created by the source system and read by the target system. Hence, the existence of a commit file then indicates that the source system documents the authenticity of the corresponding commit and thus the snapshot of the source code referred to by the commit.

The following detailed description and accompanying drawings provide a better understanding of the nature and advantages of various embodiments.

BRIEF DESCRIPTION OF THE DRAWINGS

FIG. 3 illustrates a workflow for authenticating a code commit according to some embodiments.

FIG. 4 illustrates a workflow for commit changes to software code according to some embodiments.

DETAILED DESCRIPTION

Described herein are methods and apparatuses that implement a code commit registry. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
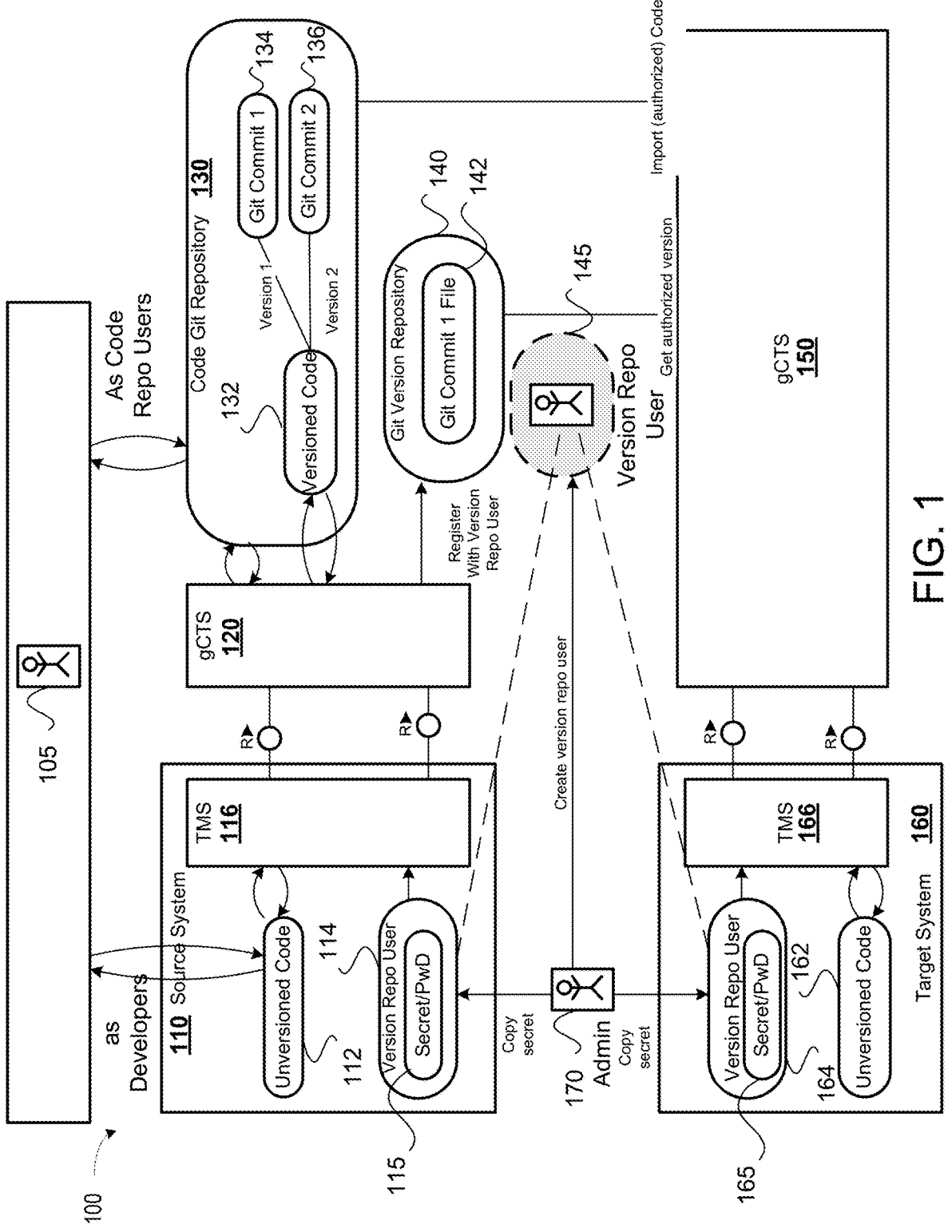
FIG. 1 illustrates a simplified diagram of a system according to some embodiments.

FIG. 1 illustrates a simplified diagram of a system according to some embodiments. In one embodiment, source and target system could be a classical SAP ERP systems (e.g. S/4HANA) where servers and database run on an operating system on a typical blade server and generic storage device found in data centers. The repositories may also be the same or similar systems. A file system may store the files of the code and the ability to run the executables that implement the version control system (i.e., the git repository). System 100 may be implemented across multiple servers or workstations. Specifically, system 100 comprises a source system 110. Source system 110 includes unversioned code 112 and transport management system (TMS) 116. User 105 may access source system 110 as a developer and make changes or modify unversioned code 112. When user 105 is satisfied with his or her changes, the changes to unversioned code 112 may be formalized through a commit to code git repository 130. In one example, one or more files may be updated at git repository 130 and the changes to the file(s) may be documented by a commit. To generate a commit, user 105 may access code git repository 130 as a code repo user and initiate the commit. When the commit is initiated, git-enabled change and transport system (gCTS) 120 may query TMS 116 for the changes to the unversioned code that were made by user 105. TMS 116 generates a git commit from these changes and transmits the git commit to gCTS 120 which in turn routes the git commit to code git repository 130 and stored as git commit 1 134 which is associated with version 1 of versioned code 132. In one example, TMS hands over changed code to gCTS. gCTS issuing the command "commit <changed code>". Technically this means, that gCTS hands over the changed code as a file to git repository 130 and asks git repository 130 to include the changed code into the sequence of code versions managed by git repository 130. Git repository 130 may summarize and document these new changes by a commit. So both the git command and the immutable documentation of the code version may be described by the term "commit". In some embodiments, TMS 116, gCTS 120, or a combination of the two may generate the git commit from the changes to the unversioned code made by the user. The next batch of changes in the unversioned code 112 of source system 110 that are made by user 105 and committed to code git repository 130 would be saved as git commit 2 136 and git commit 2 136 would be version 2 of the versioned code 132.

System 100 further comprises a target system 160. Target system 160, similar to source system 110, may include unversioned code 162 and TMS 166. Target system 160 is coupled to gCTS 150 which in turn is coupled to code git repository 130. Target system 160 may be a production system configured to deploy the unversioned code and also receive updates for the unversioned code from code git repository 130. In one example, target system 160 belongs to or is controlled by a customer of the software developer. In some embodiments, system 100 may include multiple target systems, each configured to deploy the software and receive software updates from code git repository 130. In one embodiment, target system 160 can query code git repository 130 for software updates. The software updates are versions of versioned code 132 that the target system 160 has not received yet.

The query can occur manually through a request by a user of target system 160 or it can occur on a predetermined schedule. In another embodiment, code git repository 130 can push new versions of versioned code 132 down to target system 160. The path to import code from code git repository 130 to target system 160 is that a git commit referring to the updated code is transmitted from code git repository 130 to gCTS 150 which in turn routes the git commit to TMS 166 to be merged into unversioned code 162. TMS 166, gCTS 150, or a combination of the two may convert the git commit into updates for unversioned code 162. Once merged, target system 160 may compile the merged unversioned code to deploy the any updates captured in the updated code.

System 100 further includes git version repository 140. Git version repository 140 may reside in between source system 110 and target system 160 and may serve to authenticate code. As shown, git version repository 140 may include version repo user 145. Version repo user 145 may be a user that developers, repo users and target system users are unaware of. Version repo user 145 may be created by admin 170. Admin 170 may be an administrator of system 100 who is responsible for authenticating code that is imported to target system 160 for execution. Version repo user 145 may include login credentials such as a login and a secret/password. Once admin 170 creates the version repo user in git version repository, admin 170 may create version repo user 114 in source system 110 and version repo user 164 in target system 160. Version repo user 114 may contain password 115 and version rep user 164 may contain password 165. Password 115 and password 165 may be the same credentials as version repo user 145 in git version repository 140.

For purposes of authenticating the source of code changes, TMS 116 may be configured to detect when changes to unversioned code 112 are being committed to the code git repository 130. Upon detecting of this triggering event, TMS 116 may generate a git commit from the changes to unversioned code. The git commit can then be transmitted to gCTS 120 and routed to code git repository 130 where the git commit is stored as git commit 1 134, which is version 1 of versioned code 132. TMS 116 may also generate a git commit file that stores information to uniquely identify the git commit that was generated earlier. In one example, the git commit file may store a unique ID associated with the git commit that was generated earlier. TMS 116 (or the source system 110) may then remotely log into git version repository 140 as the version repo user. The login may traverse through gCTS 120. While logged into git version repository 140, the git commit file may be stored as an entry within the git version repository 140. Here, the git commit file generated by TMS 116 would be stored as git commit 1 file 142. In one embodiment, git commit 1 file 142 is a file in git version repository that stores a unique ID associated with git commit 1 134. In another embodiment, git commit 1 file 142 is a file in git version repository 140 that stores a hash of git commit 1 134. In yet other embodiments, other information that uniquely identifies git commit 1 134 (either available within git commit 1 134 or generated/derived from information available within git commit 1 134) is stored in git commit 1 file 142. Once the git commit 1 file 142 has been generated, source system 110 can remotely log out of git version repository 140.

During deployment of updates in target system 160, target system 160 may import a git commit from the code git repository 130 that is associated with an updated version of the software code. For example, the git commit may be git commit 1 134. Target system 160 can further remotely log into git version repository 140. In one example, the credentials of version repo user 164 may be used to log into the git version repository 140. Once logged in, targets system 160 may query git version repository 140 for a git commit file that corresponds to the git commit that target system 160 would like to authenticate. Here, authentication is to verify whether the git commit was generated from changes to unversioned code 112 within the source system 110. In some instances, bad actors may generate git commits outside of source system 110 and devise a way to introduce these git commits either to the code git repository 130 or into target system 160. If a git commit file corresponding to the git commit does not exist within git version repository, then target system 160 can conclude that the code commit is not authentic. If instead a git commit file does exist within git version repository 140, then the git commit file is transmitted to gCTS 150 and routed to TMS 166 to target system 160. The information stored within the git commit file may be checked against the git commit to determine whether the information uniquely identifies the git commit. If it does not, then the git commit is not authentic and is invalid, meaning that the git commit was generated by a bad actor who may have had access to code git repository 130. In this scenario, the bad actor may have accessed a valid git commit and modified it. If instead the information stored within the git commit file does uniquely identify the git commit, then the git commit is authentic and can be used to update unversioned code 162. After retrieving or attempting to retrieve the git commit file from git version repository 140, target system 160 may remotely log out of git version repository 140. The benefits of utilizing a git version repository to authenticate code from the code git repository include no additional persistency technologies needed since git repositories and users are standard, reuse of existing git authentication mechanisms to ensure authenticity of code, and minimal operations effort since the effort to manage additional git repositories is insignificant.

Figure 2:
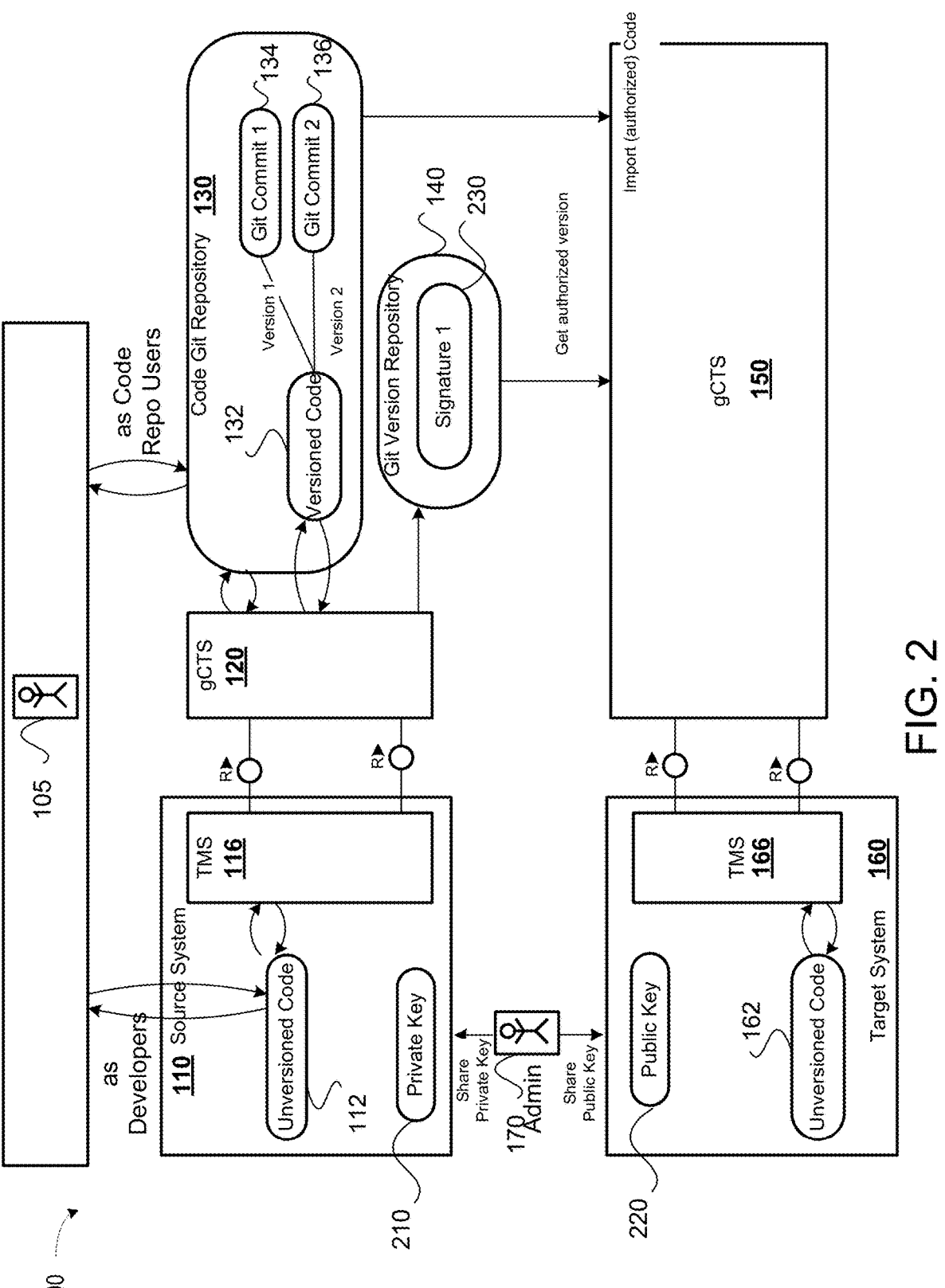
FIG. 2 illustrates another simplified diagram of a system according to some embodiments.

FIG. 2 illustrates another simplified diagram of a system according to some embodiments. System 200 is similar to system 100 of FIG. 1 except for the manner in which it authenticates git commits in the code git repository. While system 100 relies on an administrator creating a version repo user that has access to the git version repository and sharing the credentials for the version repo user with the source system and target system, system 200 relies on a private-public key pair to authenticate information in the code git repository. As shown, admin 170 generates or has access to a private public key pair. Admin 170 may share private key 210 with source system 110 and share public key 220 with target system 160. Private key 210 may be accessible to TMS 116 but kept secret from the developers that access source system 110. Similarly, public key 220 may be accessible by TMS 166 but kept secret from the users that access target system 160.

When a developer instructs source system 110 to commit the changes made to unversioned code 112, TMS 116 may generate two files. TMS 116 may first generate git commit 1 134 from the changes made to the unversioned code 112 by the developer. TMS 116 may then transmit the git commit 1 134 to gCTS 120 which in turn routes the git commit 1 134 to code git repository 130. Git commit 1 134 may then be saved as version 1 of versioned code 132. TMS 116 may also generate signature 1 230 based on the private key 210 and the git commit 1 134. In one embodiment, TMS 116 may generate a signature by combining private key 210 and a unique ID associated with git commit 1 134. The resulting signature encrypts the unique ID so that it can only be decrypted by the public key 220. Once signature 1 230 has been generated, TMS 116 may transmit the signature to gCTS 120 which in turn routes the signature to git version repository 140 where it is stored as an entry within the repository.

At some point in time, a user of target system 160 may request from code git repository 130 updates to the software. Alternatively, updates to the software may be pushed from code git repository 120 down to target system 160. Code git repository 130 may transmit git commit 1 134 to gCTS 150 which in turn routes git commit 1 134 to TMS 166. TMS 166 may process git commit 1 134 into code changes to implement in unversioned code 162. In some examples, target system 160 may authenticate the git commit prior to implementing the code changes. To authenticate the code, TMS

166 or some other component in target system 160 may request a signature from git version repository 140 that corresponds with git commit 1 134. The signature may be an encryption of the hash of the data that is signed. It may be advantageous to use a hash to reduce the size of the to-be-encrypted data. The decryption of the encrypted hash returns the original hash if the public key used for encryption matches the private key used for decryption. Here, the signature is equivalent to the encryption of the commit ID (the unique ID of a commit) by means of the private key. No hash is needed, since the commit ID is not that large. Decryption with the public key may then return the commit ID. Since possession of the private key is limited to the source system, we can prove that the commit ID is authentic by showing that commit ID was encrypted by the expected private private key. Signature 1 230 may be transmitted to gCTS 150 and then routed to TMS 166. At TMS 166, public key 220 may be applied to signature 1 230 to decipher the unique ID associated with git commit 1. If the deciphered unique ID matches the unique ID stored in git commit 1 134, then the git commit is considered authentic and the code changes can be implemented or merged into unversioned code 162 and executed. It's important to note that private key 210 and public key 220 are accessible to TMS 116 and TMS 166 respectively, but are otherwise kept secret to the users of the source system 110 and target system 120. Only admin 170 or some other trusted user of system 200 shall have permissions to modify or set the private public key pair.

FIG. 3 illustrates a workflow for authenticating a code commit according to some embodiments. In some examples, the code commit may be a git commit. Workflow 300 can be stored in computer readable medium and may be executed by one or more computers or processors in a target or production system. Workflow 300 can begin by receiving a code commit from a git repository at 310. While a git repository is described here, other types of code repositories could also be implemented. In one example, the target system may query the git repository for new code commits that have not yet been received by the target system. In another example, the target system may receive a notification or message from the git repository notifying the target system of potential software updates for software running on the target system. The code commit may contain changes to software code and a unique ID that uniquely identifies this code commit from other code commits. After receiving the request, workflow 300 continues by remotely logging into a version repository at 320. In one example, the target system logs into the version repository using credentials of a version repo user stored in the target system. The credentials of the version repo user may be kept a secret from normal users and therefore inaccessible by the normal users of the target system. In some embodiments, the credentials may be only accessible by TMS and not accessible and unknown to users.

Once logged into the version repository, workflow 300 continues by querying the version repository to locate a commit file associated with the code commit at 350. In one example, the query can include searching for an entry in the version repository that is associated with the code commit. In one embodiment, the query can be for a commit ID file having the same file name as the commit ID. In another embodiment, TMS is configured to know in which file path to find commit files and then the TMS or the gCTS can open each file and look for the commit ID. After the query, workflow 300 can remotely log out of the version repository at 340.

Workflow 300 then continues by determining whether the commit file was found or located in the version repository at 350. If the commit file was not found, then it could mean that the code commit was not generated from a commit that originated from the source system. Workflow 300 can continue by rejecting the code commit at 370. Alternatively if the commit file was found, then the code commit may have originated from a commit generated by the source system and more analysis is performed. Workflow 300 continues by authenticating the code commit with the commit file at 360. In one embodiment, authenticating the code includes determining whether the commit file contains the unique ID stored in the code commit. If the unique ID is stored within the commit file, then the code commit is considered authentic. This can mean that the code commit originated from a commit generated by the source system. Alternatively if the unique ID is not stored within the commit file, then the code commit is not considered authentic. This can mean that the code commit may have been altered by a bad actor. Workflow 300 continues by determining whether the code commit is authentic at 380. If the code commit is not authentic, then workflow 300 continues by rejecting the code commit at 385. If alternatively the code commit is authentic, then workflow 300 continues by processing the code commit in the target system at 390. Processing the code commit can include merging the changes to software stored within the code commit with software code in the target system, compiling the updated software code with the code updates, and then deploying the updated software in the target system.

FIG. 4 illustrates a workflow for commit changes to software code according to some embodiments. Workflow 400 can be stored in computer readable medium and may be executed by one or more computers or processors in a source or development system. Workflow 400 starts by detecting a request to commit changes to unversioned source code at 410. In one example, the request for a new commit may come from a developer in the source system that has made changes to the unversioned code and would like to commit those changes to the code repository. Workflow 400 can continue by generating a new commit based on the changes made at 420. In one example, the new commit can be generated by TMS in the source system. The new commit can be a new git commit. Workflow 400 can continue by transmitting the new commit to the code repository at 430. In one example, the new commit can be transmitted from TMS to gCTS and then routed to the code repository. The code repository may be a code git repository.

Workflow 400 can continue by generating a commit file containing information to uniquely identify the new commit. In one example, the commit file may store a unique ID associated with the new commit. In another example, the commit file may store a hash that uniquely identifies the new commit. In yet other examples, other data processing techniques may be employed to generate a value that uniquely identifies the new commit. Workflow 400 continues by remotely logging into a version repository at 450. In one example, logging into the version repository may be through credentials for a version repo user. The TMS on the source system may contain instructions that automatically trigger logging into the version repository whenever a request to commit changes occurs. The normal users of the source system may be unaware of the credentials for the version repo user. In one example, only the administrator of the system would have the ability to define and modify the credentials. Workflow 400 can continue by storing the commit file in the version repository at 460. Workflow 400 can then continue by remotely logging out of the version repository at 470. While workflow 400 illustrates the generation and storage of the commit file occurring after the transmission of the new commit to the code repository, it is to be understood that both actions could occur simultaneously. Alternatively, the generation and storage of the commit file could occur before the transmission of the new commit to the code repository.

Figure 5:
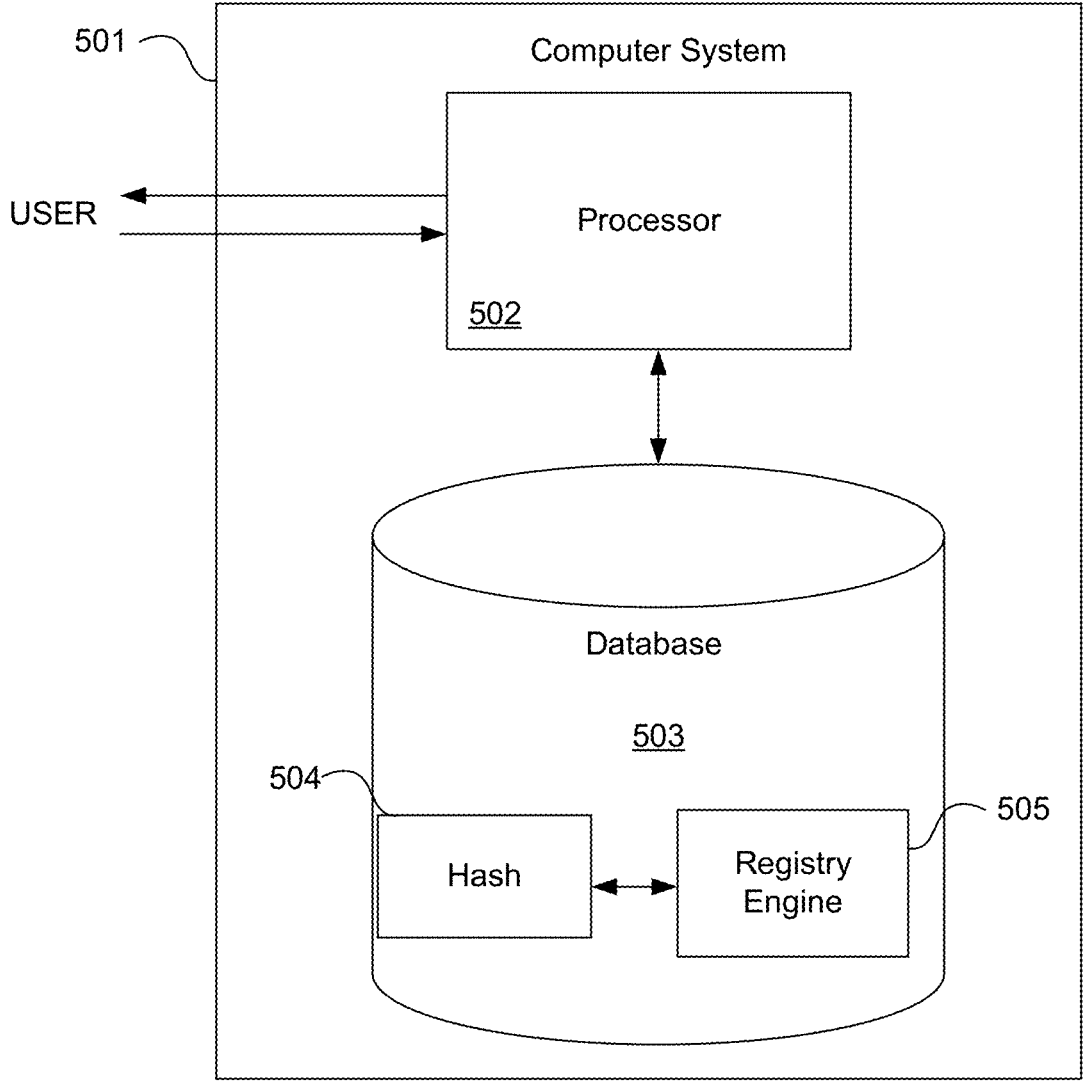
FIG. 5 illustrates hardware of a special purpose computing machine configured to implement a code commit registry according to an embodiment.

FIG. 5 illustrates hardware of a special purpose computing machine configured to implement a code commit registry according to some embodiments. In particular, computer system 501 comprises a processor 502 that is in electronic communication with a non-transitory computer-readable storage medium comprising a database 503. This computer-readable storage medium has stored thereon code 505 corresponding to a registry engine. Code 504 corresponds to a hash. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Embodiments as described herein may offer one or more advantages. One potential benefit is enhanced cooperation with prospective customers and vendors. That is, customers are free to engage vendors to develop valuable add-ons, which can then be relied on to operate seamlessly with a basic framework.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented systems and methods comprising: receiving, by a target system, a code commit from a git repository, the code commit configured to store software code changes and a unique ID that uniquely identifies the code commit;

remotely logging into a version repository; querying, by the target system, the version repository to locate a commit file associated with the code commit;
 remotely logging out of the version repository; and
 in response to locating the commit file in the version repository: authenticating the code commit; and
 processing, by the target system, the code commit in response to the authentication.

Example 2. The computer implemented systems or methods of Example 1 wherein authenticating the code commit includes determining the commit file contains the unique ID.

Example 3. The computer implemented systems or methods of Example 1 wherein processing the code commit includes updating software on the target system with software code changes stored within the code commit.

Example 4. The computer implemented systems or methods of Example 1 wherein an administrator creates a version repository user in the version repository and shares credentials of the version repository user with the target system and a source system.

Example 5. The computer implemented systems or methods of Example 4 wherein remotely logging into the version repository includes providing the credentials of the version repository user stored in the target system.

Example 6. The computer implemented systems or methods of Examples 4 or 5 further comprising:
 receiving, by the source system, a request to commit the software code changes;

generating, by the source system, the code commit based on the software code changes;

transmitting, by the source system, the code commit to the git repository;

remotely logging into the version repository with the credentials as the version repository user;

generating the commit file in the version repository, the commit file containing the unique ID associated with the code commit; and remotely logging out of the version repository.

Example 7. The computer implemented systems or methods of Examples 4, 5, or 6 wherein transmitting the code commit to the git repository comprises transmitting the code commit to a git-enabled change and transport system (gCTS), wherein the gCTS routes the code commit to the git repository.

Example 8. The computer implemented systems or methods of Example 1 wherein the git repository is configured to store a plurality of code commits, wherein each code commit is associated with a modification to the software code.

Example 9. The computer implemented systems or methods of Examples 4, 5, 6, 7, or 8 further comprising rejecting the code commit in the target system in response the query.

Figure 6:
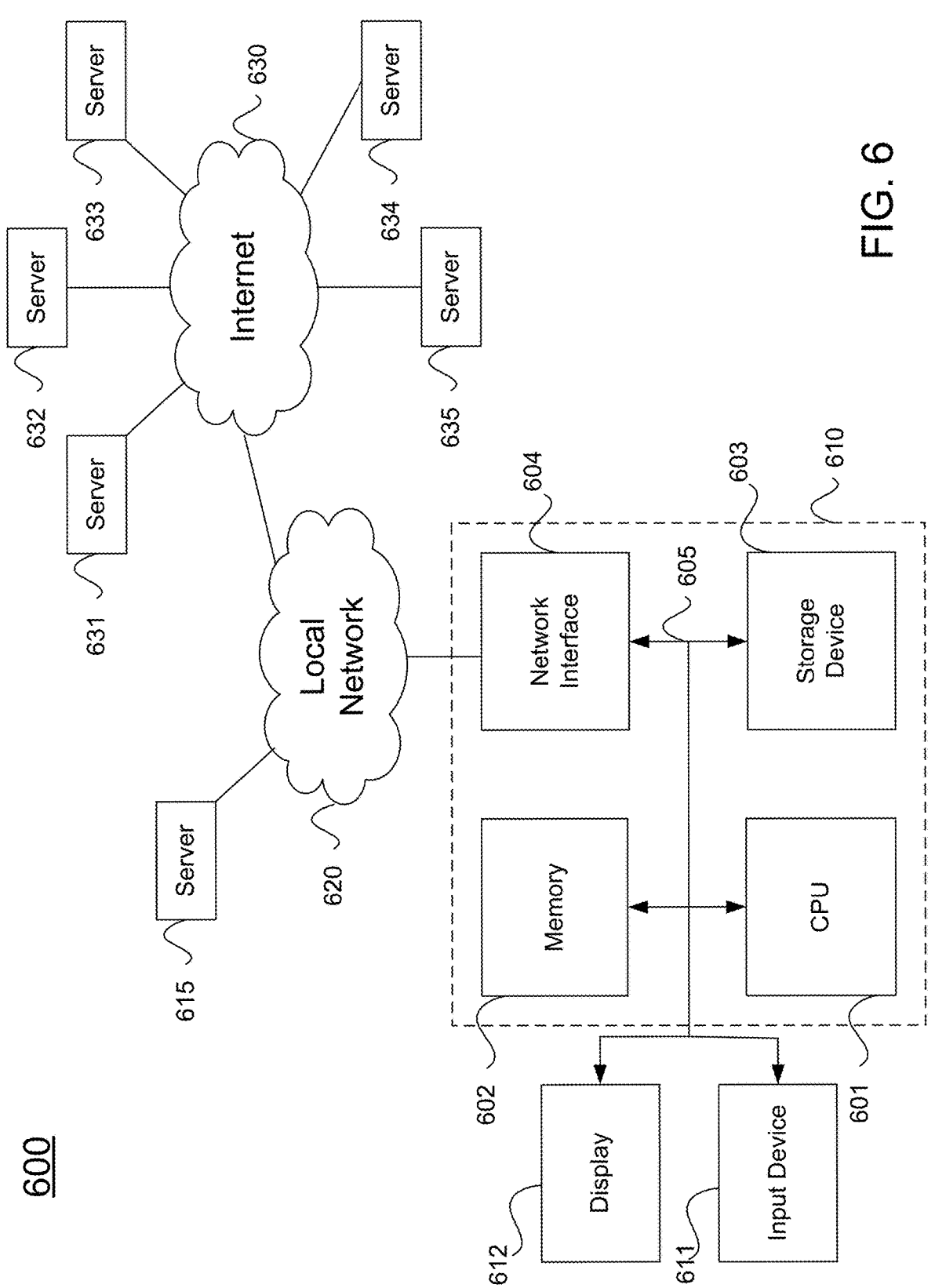
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a Light Emitting Diode (LED) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:

receiving, by a target system, a code commit from a git repository, the code commit configured to store software code changes and a unique ID that uniquely identifies the code commit;

remotely logging into a version repository;

querying, by the target system, the version repository to locate a commit file associated with the code commit;

remotely logging out of the version repository;

in response to the query not locating the commit file in the version repository, rejecting the code commit in the target system;

in response to the query locating the commit file in the version repository:

authenticating the code commit; and processing, by the target system, the code commit in response to the authentication.

2. The method as in claim 1, wherein authenticating the code commit includes determining the commit file contains the unique ID.

3. The method as in claim 1, wherein processing the code commit includes updating software on the target system with software code changes stored within the code commit.

4. The method as in claim 1 wherein an administrator creates a version repository user in the version repository and shares credentials of the version repository user with the target system and a source system.

5. The method as in claim 4 wherein remotely logging into the version repository includes providing the credentials of the version repository user stored in the target system.

6. The method as in claim 4 further comprising:

receiving, by the source system, a request to commit the software code changes;

generating, by the source system, the code commit based on the software code changes;

transmitting, by the source system, the code commit to the git repository;

remotely logging into the version repository with the credentials as the version repository user;

generating the commit file in the version repository, the commit file containing the unique ID associated with the code commit; and remotely logging out of the version repository.

7. The method as in claim 6, wherein transmitting the code commit to the git repository comprises transmitting the code commit to a git-enabled change and transport system (gCTS), wherein the gCTS routes the code commit to the git repository.

8. The method as in claim 1, wherein the git repository is configured to store a plurality of code commits, wherein each code commit is associated with a modification to the software code.

9. A non-transitory computer readable storage medium embodying a computer program for performing a method, said method comprising:

receiving, by a target system, a code commit from a git repository, the code commit configured to store software code changes and a unique ID that uniquely identifies the code commit;

remotely logging into a version repository;

querying, by the target system, the version repository to locate a commit file associated with the code commit;

remotely logging out of the version repository;

in response to the query not locating the commit file in the version repository, rejecting the code commit in the target system;

in response to the query locating the commit file in the version repository:

authenticating the code commit; and processing, by the target system, the code commit in response to the authentication.

10. The non-transitory computer readable storage medium as in claim 9 wherein authenticating the code commit includes determining the commit file contains the unique ID.

11. The non-transitory computer readable storage medium as in claim 9 wherein processing the code commit includes updating software on the target system with software code changes stored within the code commit.

12. The non-transitory computer readable storage medium as in claim 9 wherein an administrator creates a version repository user in the version repository and shares credentials of the version repository user with the target system and a source system.

13. The non-transitory computer readable storage medium as in claim 12 wherein remotely logging into the version repository includes providing the credentials of the version repository user stored in the target system.

14. The non-transitory computer readable storage medium as in claim 12 further comprising:

receiving, by the source system, a request to commit the software code changes;

generating, by the source system, the code commit based on the software code changes;

transmitting, by the source system, the code commit to the git repository;

remotely logging into the version repository with the credentials as the version repository user;

generating the commit file in the version repository, the commit file containing the unique ID associated with the code commit; and remotely logging out of the version repository.

15. The non-transitory computer readable storage medium as in claim 14, wherein transmitting the code commit to the git repository comprises transmitting the code commit to a git-enabled change and transport system (gCTS), wherein the gCTS routes the code commit to the git repository.

16. A computer system comprising:

one or more processors;

a software program, executable on said computer system, the software program configured to cause an in-memory database engine of an in-memory database to:

receive, by a target system, a code commit from a git repository, the code commit configured to store software code changes and a unique ID that uniquely identifies the code commit;

remotely log into a version repository;

query, by the target system, the version repository to locate a commit file associated with the code commit;

remotely log out of the version repository;

in response to the query not locating the commit file in the version repository, rejecting the code commit in the target system;

in response to the query locating the commit file in the version repository:

authenticate the code commit; and process, by the target system, the code commit in response to the authentication.

17. The computer system as in claim 16 wherein an administrator creates a version repository user in the version repository and shares credentials of the version repository user with the target system and a source system.

18. The computer system as in claim 17, further comprising:

receiving, by the source system, a request to commit the software code changes;

generating, by the source system, the code commit based on the software code changes;

transmitting, by the source system, the code commit to the git repository;

remotely logging into the version repository with the credentials as the version repository user;

generating the commit file in the version repository, the commit file containing the unique ID associated with the code commit; and remotely logging out of the version repository.

19. The computer system as in claim 18 wherein transmitting the code commit to the git repository comprises transmitting the code commit to a git-enabled change and transport system (gCTS), wherein the gCTS routes the code commit to the git repository.

* * * * *